Sept. 1, 1970 M. DISHAL ET AL 3,526,849

AUTOMATIC GAIN CONTROL AMPLIFIER SYSTEM

Filed Aug. 26, 1968 3 Sheets-Sheet 1

INVENTORS
MILTON DISHAL
JESSE S. LeGRAND
BY Philip M. Bolton
ATTORNEY

INVENTORS
MILTON DISHAL
JESSE S. LeGRAND
BY Philip M. Bolton
ATTORNEY

AUTOMATIC GAIN CONTROL AMPLIFIER SYSTEM

Filed Aug. 26, 1968 3 Sheets-Sheet 3

INVENTORS
MILTON DISHAL
JESSE S. Le GRAND
BY Philip M. Bolton
ATTORNEY

United States Patent Office 3,526,849
Patented Sept. 1, 1970

3,526,849
AUTOMATIC GAIN CONTROL AMPLIFIER SYSTEM

Milton Dishal, Upper Montclair, and Jesse S. Le Grand, Clifton, N.J., assignors to International Telephone and Telegraph Corporation, Nutley, N.J., a corporation of Delaware

Filed Aug. 26, 1968, Ser. No. 755,083
Int. Cl. H03g *3/20*
U.S. Cl. 330—139 10 Claims

ABSTRACT OF THE DISCLOSURE

In a TACAN navigation system where the received signals are pulse pairs of substantially equal amplitude but the amplitude of different pairs may vary widely, an automatic gain control system is used to control an amplifier so that its output pulses fall within a more restricted range at which subsequent components operate more efficiently. The first pulse of each pair is applied to a logarithmic amplifier to develop an AGC signal which adjusts the gain of a linear amplifier before the second pulse of the pulse pair is applied so that the latter is amplified by the proper amount. A time delay may also be provided at the input of the linear amplifier through a switch, thereby providing that the first pulse will control its own amplification.

BACKGROUND OF THE INVENTION

This invention relates to automatic gain control amplifier systems and more particularly to a gain controlled amplifier system for receivers in systems using pulses in groups.

Receivers for navigation equipment often operates on pulse groups, e.g. TACAN operates on pulse pairs. In such systems the amplitude of each pulse of a pulse pair is substantially the same, as being from a fixed source (an aircraft). Many aircraft, however, will transmit to, and receive signals from, a single TACAN beacon. For this reason the pulses of pulse pairs transmitted from different planes will vary widely in amplitude, as some transmitters (aircraft) will be much closer to the TACAN antenna than others. For the required navigation information to be obtained, it is necessary that various operations be performed on the pulses received by the navigation equipment. For example, to accomplish precision distance measurement, which is a function of TACAN, an elapsed time measurement must be made, and it is therefore necessary that some portion of a received DME (distance measuring equipment) interrogation pulse be precisely selected and defined in order to give some precise point from which to measure. In TACAN, the half amplitude point of the second pulse in a pulse pair has been selected for this purpose. This operation, and others, can be performed more accurately if pulses varying over a restricted amplitude range can be provided to portions of the navigation system regardless of the amplitude of the pulses received by the equipment. In the case of TACAN in particular, it is a requirement that output amplitude variations in the second pulse of the received pulse pair be minimized for an input carrier variation of more than 80 db. Also, the receiver must have good adjacent channel splatter rejection and good echo rejection.

Prior art systems which utilize a linear amplifier, with grid leak back biasing for AGC for providing pulses to portions of the navigation system are deficient in that they are incapable of accurate response when large, rapid variations in gain are required where a TACAN station is being interrogated by a large number of aircraft.

For achieving good adjacent channel splatter rejection and good echo rejection, most prior art systems utilize what is commonly known as a Ferris circuit (or Ferris discriminator). The disadvantages of a system utilizing a Ferris circuit are that such discriminators are difficult to align and that optimum system noise bandwidths are not easily obtained, thus causing less than maximum sensitivity.

SUMMARY OF THE INVENTION

Therefore, the main object of this invention is to provide an automatic gain controlled amplifier system which is responsive to signals rapidly varying in amplitude over a wide amplitude range.

A feature of this invention is to provide such an amplifier system with optimum system noise bandwidth, thus providing maximum system sensitivity.

According to the present invetnion there is provided an automatic gain control amplifier system wherein pulse groups are coupled to a first amplifier providing an AGC signal which is a function of the amplitude of a given pulse of said group, and to a second amplifier, said AGC signal controlling the amplification in said second amplifier of a pulse in the same group as said given pulse, the amplification characteristics of said first amplifier and said second amplifier being inverse one to the other and providing a signal the magnitude of which is independent of the magnitude of said given pulse.

Further objects and features of this invention will become more apparent by reference to the following description taken in conjunction with the accompanying drawings, in which:

DESCRIPTION OF THE PREFERRED EMBODIMENT

Figure 1:
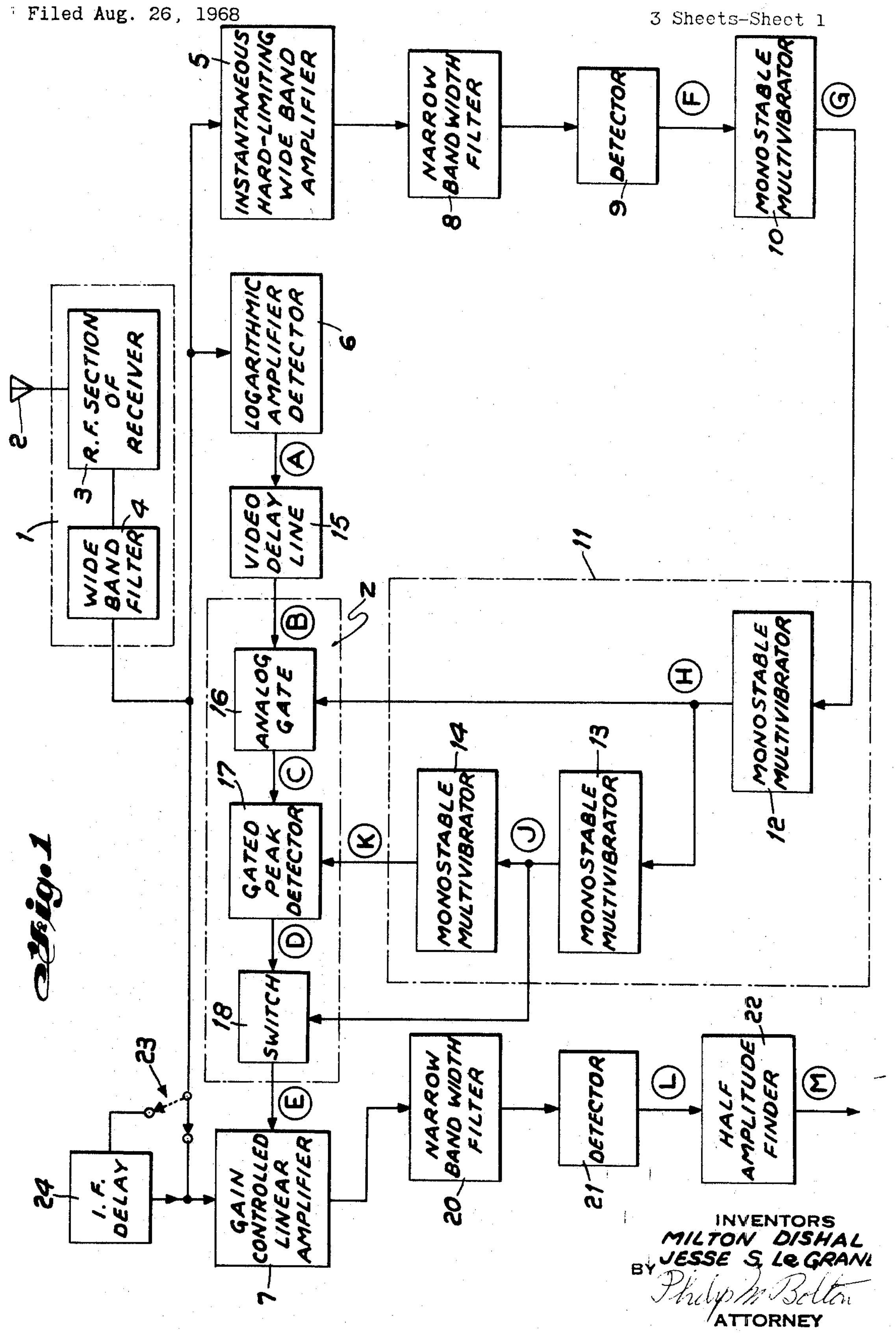
FIG. 1 is a block diagram of a preferred embodiment of the instant invention.
Figure 2:
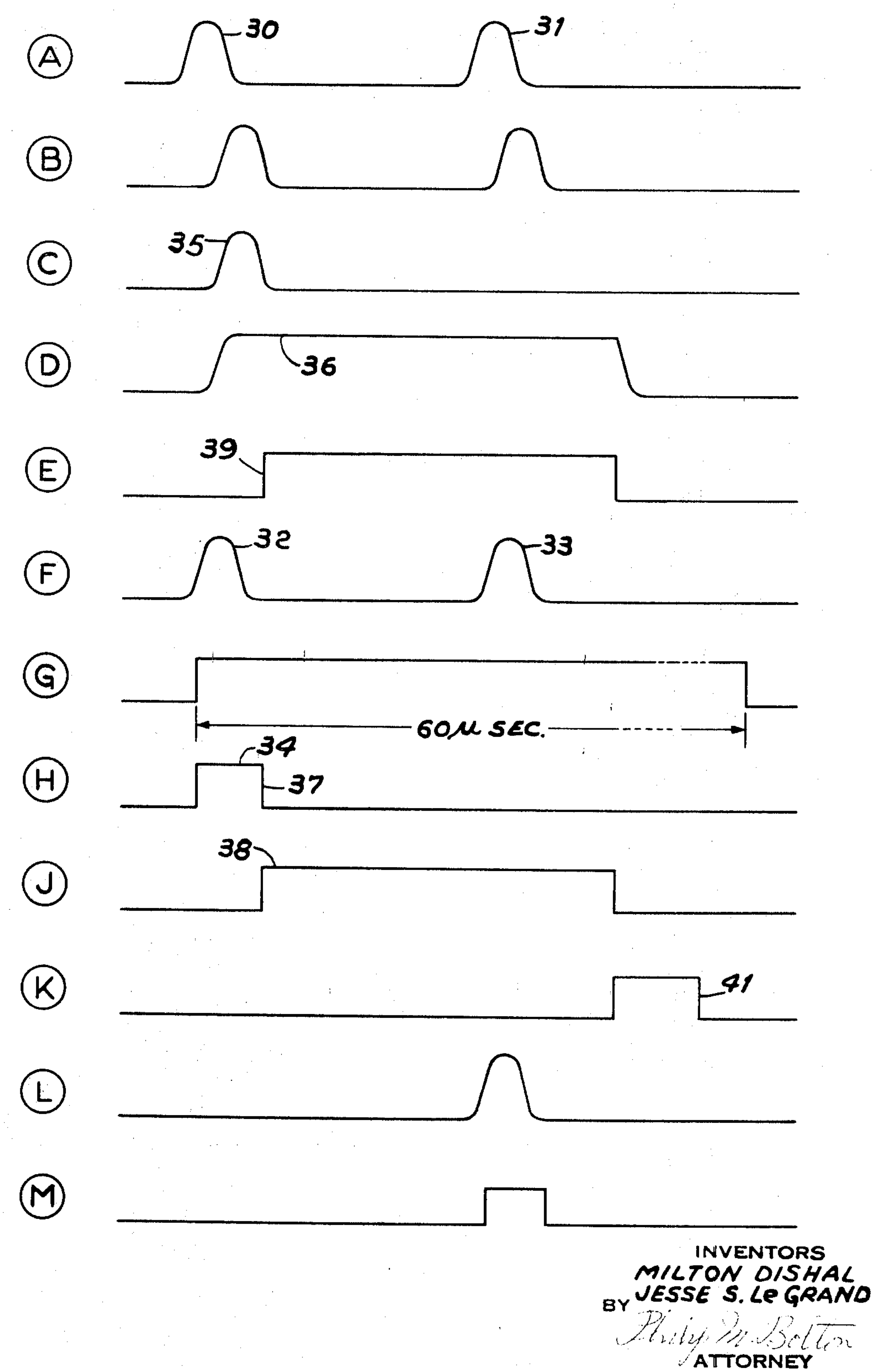
FIG. 2 illustrates the waveforms at designated points in the block diagram of FIG. 1.

Referring to FIG. 1 there is shown an automatic gain control amplifier system according to the invention for receiving pulse pairs which are utilized in DME systems such as TACAN and the like. Such a system includes a receiver 1 coupled to an antenna 2, the receiver 1 including an RF section 3 and a wide band filter 4. The output of wide band filter 4 is at the IF frequency and is coupled to an instantaneous hard limiting amplifier 5, to a logarithmic IF amplifier detector 6 and to a gain controlled linear IF amplifier 7 through a switch 23 either directly or via an IF delay 24. (Although hard limiting amplifier 5 and logarithmic amplifier 6 are illustrated as individual units, presently designed logarithmic amplifiers provide a hard-limited output at a normally unused terminal. Thus, a separate hard limiting amplifier need not be provided if the hard-limited output of said logarithmic amplifier is utilized.) The output of the hard limiting amplifier 5 is coupled to a narrow bandwidth filter 8, the output of which is coupled to detector 9. The operation of the combination of the hard limiting amplifier 5, the narrow bandwidth filter 8 and the detector 9 is described in Pat. No. 3,375,514. The purpose of this combination is to provide an indication of an "on channel" pulse being received and the details of the operation thereof is described in the above-mentioned patent. Therefore, a detailed description is not included herein but the pertinent waveforms relating to this combination are shown in FIG. 2 for ease of explanation of the overall system operation.

The output of detector 9 is coupled to a monostable multivibrator 10, the function of which is to insure that the circuitry which follows can not be retriggered during the specified system dead time. The output of the multivibrator 10 is coupled to a gate generator 11, which includes monostable multivibrators 12, 13 and 14. The monostable multivibrators 10, 12, 13 and 14 are of a type well known in the art and are therefore not described in detail herein. It is pointed out, however, that multivibrators 10 and 12 provide an output responsive to the leading-edge of the input pulse, and multivibrators 13 and 14 provide their outputs in response to the trailing-edge of the input pulse.

The output of the wideband filter 4 is coupled to the log IF amplifier detector 6, the output of which is coupled to a video delay element 15. The output of delay element 15 is connected to an analog gate 16, the output of which is coupled to a gated peak detector 17. The output of the peak detector 17 is connected through a switch 18 to the input of the gain controlled linear IF amplifier 7.

Within block 11 (labeled gate generator), the output of multivibrator 10 is coupled to the input of multivibrator 12, the output of multivibrator 12 being connected to multivibrator 13, and the output of multivibrator 13 is coupled to the input of multivibrator 14. One output of gate generator 11 (the output of multivibrator 12) is coupled to the gate input of the analog gate 16 and another output of gate generator 11 (the output of multivibrator 14) is coupled to the reset input of gated peak detector 17. The third output of gate generator 11 (the output of multivibrator 13) is coupled to the gate input of the switch 18.

The output of IF amplifier 7 is coupled to a narrow bandwidth filter 20, the output of which is coupled to a detector 21. The output of detector 21 is coupled to a one-half amplitude finder 22 which is utilized to obtain navigation information from the received TACAN pulse pairs in a manner well known in the art. See Pat. No. 3,375,514 for a more detailed description of the operation of such a navigation system and of the operation of a typical one-half amplitude finder.

The operation of the circuit of FIG. 1 will now be described with reference to the waveforms appearing in FIG. 2. Upon receipt of a typical pulse pair from a TACAN navigation system or the like, the log IF amplifier detector 6, the characteristic of which is such that $\Delta E_{out}=K_1\ (\Delta E_{in\ (d.b.)})$, or $E_{out}=K_1\ (E_{in\ (d.b.)})+C$, where $K_1$ is the amplifier's amplification factor and C is a constant, provides output pulses 30 and 31 as shown in FIG. 2A. Pulse 30 serves as the AGC signal, its amplitude being a function of the amplitude of the first pulse of the received pulse pair. The AGC pulse 30 is applied to video delay 15, as is pulse 31, for the purpose of delaying them so that proper synchronization and gating may be provided, said gating to be subsequently discussed The output from the video delay line, as shown in FIG. 2B, is applied to analog gate 16, the function of which is to pass pulse 30 in response to a gating signal, said gating signal, to be discussed below, preventing the further transmission of pulse 31. Pulse 35, as shown in FIG. 2C, is transmitted from the analog gate 16 to peak detector 17, which transmits only the peak value of the signal it receives. The output of the peak detector, as shown in FIG. 2D, is applied to switch 18, the function of which is to switch the gain control buss of the linear amplifier 7 from a minimum gain bias to the AGC signal at the proper time, in response to a gate pulse. The AGC signal at the output of the switch, as shown in FIG. 2E, is provided to the gain controlled linear IF amplifier 7 so as to control the amplification of the second TACAN pulse applied to the linear amplifier. The operations to be performed on the output signal from linear amplifier 7 will be described subsequently.

At the same time that the pair of input pulses is applied to logarithmic amplifier 6, they are also applied to the instantaneous hard-limiting amplifier 5, and through amplifier 5 to narrow bandwidth filter 8 and detector 9. Amplifier 5 is hard-limiting on noise, i.e., it always provides peak output power, even when no signal is being received and it is responding only to thermal noise. In this manner the application of a TACAN pulse utilizes the total output power available from amplifier 5, thereby limiting the noise output power. The output of the amplifier 5 is provided to narrow bandwidth filter 8, so as to pass only those pulses occurring at the operating frequency of the TACAN system. The output from filter 8 is applied to detector 9, which includes a level detector having an adjustable threshold which provides an output only when a signal above said threshold level is received from filter 8. Thus, adjustment of said threshold level enables monostable multivibrator 10 to be triggered by received signals and by a desired number of noise peaks. The output of detector 9, assuming the condition where no noise is present, is pulses 32 and 33 shown in FIG. 2F which correspond to the input pulse pair received at antenna 2.

The output of detector 9, is applied to the monostable multivibrator 10, the function of which is to prevent any of the circuitry following multivibrator 10 from being triggered again until the expected time of arrival of the second pair of pulses from the navigational equipment. This is accomplished by providing that the output of monostable multivibrator 10, in response to pulse 32 of FIG. 2F, will have a predetermined switching time, in the instant care, of approximately 60 microseconds as shown in FIG. 2G, while pulse 33 of FIG. 2F occurs approximately 12 microseconds after the occurence of pulse 32. The output of multivibrator 10 is applied to monostable multivibrator 12 which provides output pulse 34, shown in FIG. 2H, to the analog gate 16 causing the transmission of the proper on-channel AGC signal shown in FIG. 2C from the analog gate to the gated peak detector 17 as previously discussed. The trailing edge 37 of pulse 34 triggers monostable multivibrator 13, causing it to provide pulse 38, shown in FIG. 2J, which switches the gain control buss of IF amplifier 6 from its minimum gain bias to the AGC signal 39 shown in FIG. 2E. The duration of the output of multivibrator 13 shown as pulse 38 of FIG. 2J, is long enough to overlap the time during which the second pulse of the received TACAN pulse pairs is received by linear amplifier 7, and therefore the AGC signal is applied to the linear IF amplifier during the time that it is operating on the second pulse of the received pulse pair. After the monostable multivibrator 13 has timed out, the trailing edge of output pulse 38, shown in FIG. 2J, triggers monostable multivibrator 14 which generates pulse 41 shown in FIG. 2K, which is fed to the reset input of gated peak detector 17 discharging the peak detector, thereby rendering the system ready to receive the next pulse pair. Note that the resetting of the peak detector occurs after the system has received and operated on the second pulse of the pulse pair.

It is pointed out that as previously stated the amplitude of the AGC signal 39 of FIG. 2E determines the gain of amplifier 7. It should be clear also that the level of the AGC signal 39 is a function of the peak amplitude of pulse 30, which in turn is a function of the amplitude of the first pulse of the received TACAN pulse pair. The characteristic of linear amplifier 7 is such that $\Delta Gain_{(d.b.)}=K_2\Delta E_{bias}$. Therefore $$E_{out\ (d.b.)}=E_{in\ (d.b.)}+Gain_{(d.b.)}$$

and by substitution $E_{out\ (d.b.)}=E_{in\ (d.b.)}+K_2E_{bias}+C_2$. By setting $K_2$, the amplification factor of amplifier 7 equal to $$-\frac{1}{K_1}$$

where $K_1$ is as previously stated, the amplification factor of logarithmic amplifier detector 6, and by recognizing that $E_{out}$ of logarithmic amplifier 6 is $E_{bias}$ of linear amplifier 7, it is seen that $E_{out\ (d.b.)}$ of amplifier 7 is equal to $$E_{in\ (d.b.)}+\left(-\frac{1}{K_1}\right)(K_1E_{in\ (d.b.)})+C+C_2$$

Thus, it is seen that the output voltage of linear amplifier 7 is a constant, independent of the amplitude of the pulses received at antenna 2. The operation of the system is based on a premise that the amplitude of a second pulse of a pulse pair is substantially equal to the amplitude of the first pair, and in practice this is a valid assumption. In an experimental model of the above-described system, it was found that with a variation in input signal level of approximately 80 db, the output of the linear IF amplifier 7 could be maintained substantially constant within ±6 db.

Under some circumstances it may be desirable to have the first pulse of the pulse group amplified while the second pulse is used for another purpose. If amplification of the first pulse is desired the switch 23 of FIG. 1 is placed in the position indicated by the dashed line, and the first pulse received by antenna 2 is transmitted to linear amplifier 7 through IF Delay 24 which provides a suitable time delay. In this manner the first pulse of the group provides the AGC signal and timing, as heretofore described, for its own amplification.

The output of the linear IF amplifier 7 is now applied through narrow bandwidth filter 20, detector 21 and to a half-amplitude finder 22. The operation of these devices are well known in the art and are not critical to the basic concepts employed in the instant invention. Therefore, these blocks will not be described in detail herein. The pertinent output signals from these blocks are, however, respectively illustrated in FIGS. 2L and 2M in order to aid in the understanding of the overall system in which the above-described inventive concepts are utilized.

Figure 3:
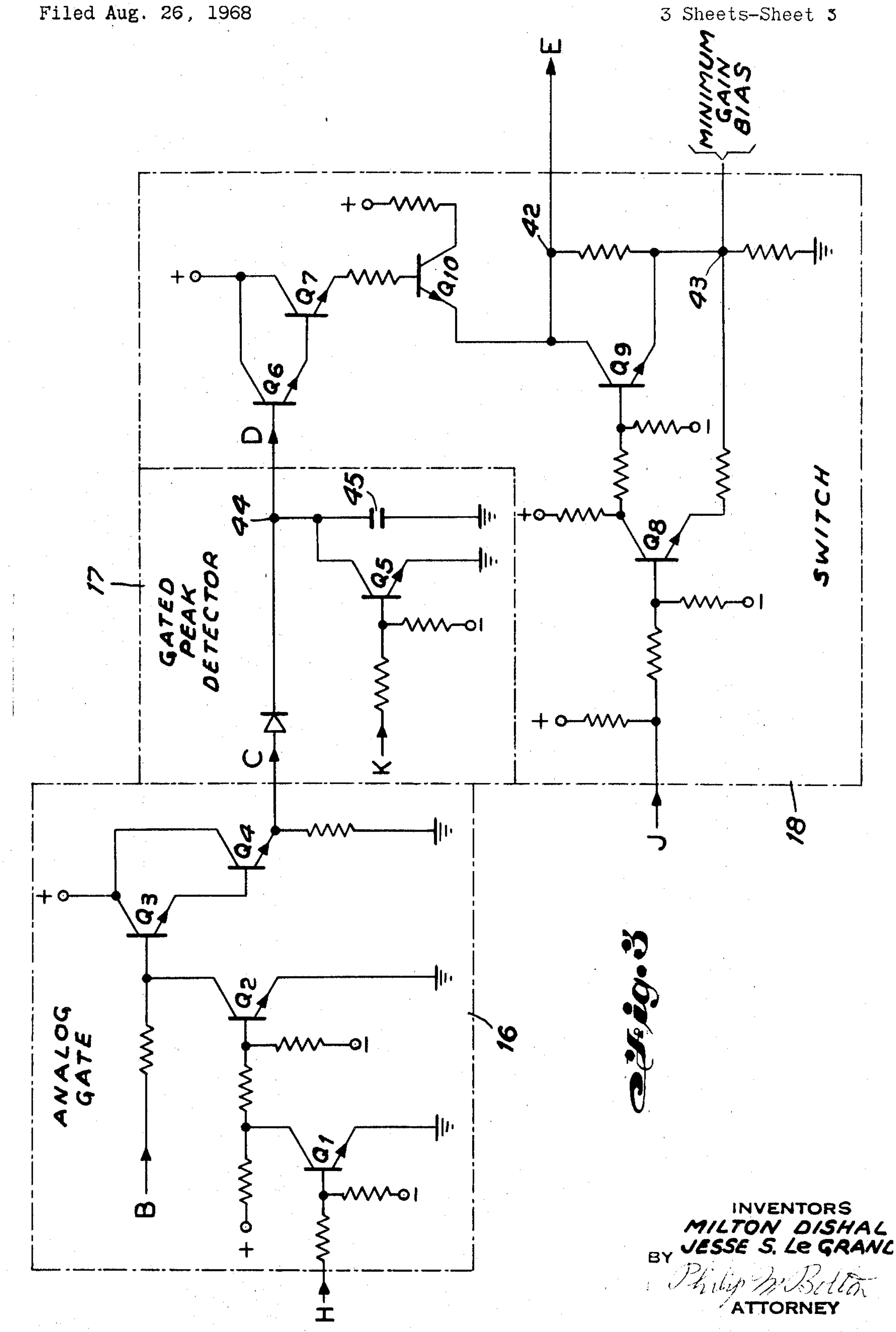
FIG. 3 is a circuit diagram of the components of FIG. 1 designated by the letter Z and includes the analog gate, the gated peak detector, and the switch of the instant invention, which are shown in block form in FIG. 1.

The circuit of FIG. 3 which includes the components of FIG. 1 designated by the letter Z and includes the analog gate, the gated peak detector and the switch of the instant invention are of types well known in the art, but for the sake of clarity, its operation is described with reference to the signals indicated in FIG. 1, and shown in FIG. 2.

The signal B is applied to the base of transistor $Q_3$ in the analog gate 16. The base of transistor $Q_3$ is, however, normally shunted to ground through the collector-emitter circuit of transistor $Q_2$. When the signal H from monostable multivibrator 12 is applied to analog gate 16, this turns transistor $Q_1$ on, turning transistor $Q_2$ off, thereby causing the base voltage of transistor $Q_3$ to rise to the level of the signal B. Thus, only while the signal H is applied to the analog gate 16 is signal B transmitted to gated peak detector 17, as indicated by the signal C. The peak value of the signal C is stored in capacitor 45 and is transmitted as signal D to the base of transistor $Q_6$ of switch 18. (This sequence occurs in the absence of the signal K being applied to gated peak detector 17 thereby keeping transistor $Q_5$ in its quiescent state. The application of signal K to the gated peak detector occurs subsequently in time and will be discussed below.) The signal D which is the AGC signal from the peak detector is transmitted through the emitter-follower circuit composed of transistors $Q_6$, $Q_7$ and $Q_{10}$ to point 42 from where it is applied, as signal E, to the linear amplifier 7. Until, however, the signal J from monostable multivibrator 13 is applied to the transistor $Q_8$ of switch 18, $Q_8$ is off and transistor $Q_9$ is on, thereby shunting point 42 to point 43 at which a minimum gain bias is maintained, and therefore this minimum gain bias will be the signal E. When signal J is applied to transistor $Q_8$ of switch 18, $Q_8$ is turned on, turning $Q_9$ off, thereby disconnecting point 42 from point 43. At such time signal E, the AGC input to linear amplifier 7, will rise to the level of signal D. As previously stated, monostable multivibrator 14 is responsive to the trailing edge of signal J, the output of multivibrator 13, and due to the time span of signal J, also previously discussed, monostable multivibrator 14 will not provide signal K to peak detector 17 until after a second pulse of a pulse pair has been amplified by amplifier 7. At this time, signal K is transmitted to transistor $Q_5$ of peak detector 17, turning $Q_5$ on and shorting point 44 to ground through the collector-emitter circuit of transistor $Q_5$. This operation discharges capacitor 45 and the system is now prepared to receive the next pulse pair.

We claim:

1. An automatic gain control amplifier system comprising:

a source of pulse groups, first amplifying means responsive to a given pulse in each of said groups for providing an AGC signal which is a function of the amplitude of said given pulse, second amplifying means coupled to said source, and means for coupling the AGC signal to said second amplifying means to control the amplification therein of a pulse in the same group as said given pulse the amplification characteristics of said first and second amplifying means being inverse one to the other for providing a signal the magnitude of which is independent of the magnitude of said given pulse.

2. An automatic gain control amplifier system according to claim 1 wherein said first amplifying includes a logarithmic amplifier for amplifying pulses from said source.

3. An automatic gain control amplifier system according to claim 1 wherein said coupling means is normally inoperative, further including:

means coupled to said source and responsive to a pulse in said group to make said coupling means operative.

4. An automatic gain control amplifier system according to claim 3 wherein said coupling means comprises:

means providing a path for transmitting said AGC signal and blocking other signals transmitted from said responsive means, means receiving the AGC signal from said path providing means and storing the peak value of said AGC signal, and switching means receiving said peak signal and transmitting it to the input of said linear amplifier.

5. An automatic gain control amplifier system according to claim 4 wherein said means coupled to said source further includes means for generating gating signals for activating said path providing means, said peak storing means, and said switching means.

6. An automatic gain control amplifier system according to claim 3 wherein the means coupled to said source further includes:

pulse selecting means providing a signal output when an appropriate pulse is received from said source, first pulsing means providing an output signal in response to a signal from said selecting means and maintaining said responsive signal for a predetermined period of time, and gating means responsive to the output of said pulsing means providing activation signals to said coupling means.

7. An automatic gain control amplifier system according to claim 3 wherein said amplified pulse is subsequent to said given pulse.

8. An automatic gain control amplifier system according to claim 8 wherein said pulse making said coupling means operative precedes said subsequent pulse.

9. An automatic gain control amplifier system according to claim 9 wherein said pulse preceding said subsequent pulse is said given pulse.

10. An automatic gain control amplifier system, according to claim 2, wherein said second amplifying means includes a linear amplifier.

References Cited

UNITED STATES PATENTS

| | | | |
|---|---|---|---|
| 3,289,203 | 11/1966 | Gaylord | 343—106 X |
| 3,375,447 | 3/1968 | Van Der Beek | 330—141 X |

ROY LAKE, Primary Examiner

J. B. MULLINS, Assistant Examiner

U.S. Cl. X.R.

330—141; 343—106